April 25, 1961 R. L. KIBBEY ET AL 2,981,925
ELECTRICAL CONNECTIONS
Filed June 18, 1957
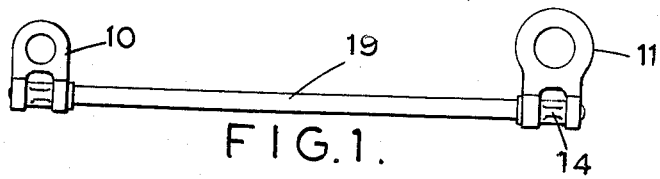
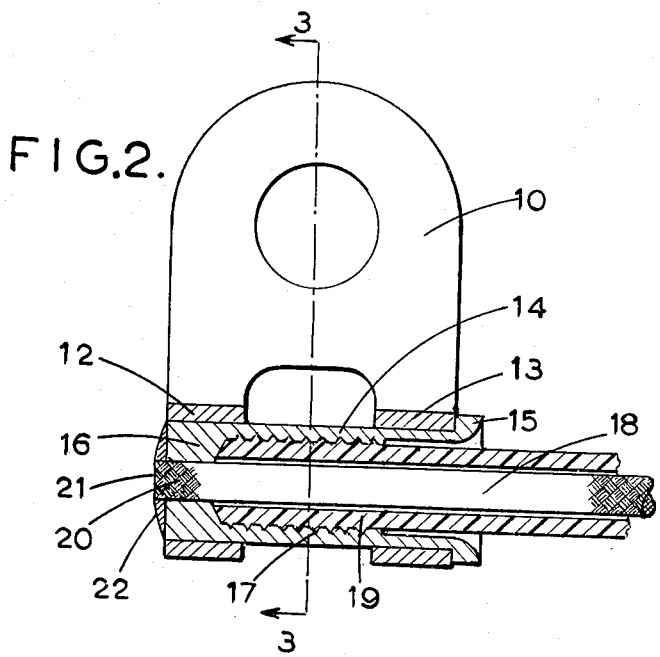
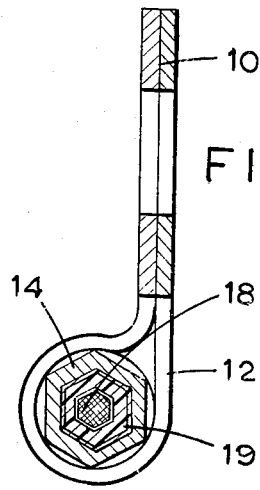
RONALD LIONEL KIBBEY
&
GEORGE PEAT
Inventors
by Leech & Radue
Attorney

2,981,925

ELECTRICAL CONNECTIONS

Ronald Lionel Kibbey, Mackworth, and George Peat, Derby, England, assignors to Rolls-Royce Limited, Derby, England Filed June 18, 1957, Ser. No. 666,366

Claims priority, application Great Britain July 3, 1956

5 Claims. (Cl. 339—223)

This invention is for improvements in electrical connections of the type in which an electrical lead consisting of a wire or wire braid has to be connected to metal terminals.

One example of such an application is the bonding leads commonly used on aircraft engines as part of the electrical equipment thereof. Said bonding leads normally consist of a length of metal braiding which at each end is received in a terminal and soldered thereto. When these leads are being fitted on an engine and a nut is being tightened down on to one of the terminals the natural tendency to is to hold the braiding near the terminal with the other hand to prevent the clip rotating with the nut. The braiding thus tends eventually to fail in fatigue near the terminal. Even if the braiding does not fail completely some of the strands are likely to break with the possbility of causing interference with the aircraft radio.

Another disadvantage experienced with the ordinary bonding lead and terminal is that some of the solder may pass right through the terminal and make the braiding rigid where it enters the terminal. When the lead is flexed the bending then tends to be localised at the point where the soldered part of the braiding terminates.

According to this invention there is fitted over the lead a sleeve of rubber beyond which the end of the lead projects, the terminal has two axially aligned sleeves with a gap between them, into these sleeves a socket member is passed and secured thereto, the sleeved lead is passed into the socket member, the projecting end of the lead passing through a hole in an end wall of the socket and projecting beyond the same, and the socket between the two sleeves of the terminal is deformed to grip the rubber sleeve and the said lead and projecting beyond said end wall is soldered to said wall.

In the expression "rubber" there is included synthetic rubber and the preferred material for the sleeve is polytetrafluor-ethylene (hereinafter called "p.t.f.e.").

Preferably the socket is internally threaded. It may be deformed into a hexagonal shape to grip the sleeve after the sleeve has been inserted.

In a bonding lead the lead will be connected to a terminal at either end in this way.

A bonding lead so secured is illustrated in the accompanying drawing.

In this drawing

Figure 1 shows a complete bonding lead according to the invention extending between two typical styles of terminal.

Figure 2 is a section through a terminal showing how the lead is received in the terminal, and Figure 3 is a section on the line 3—3 of Figure 2.

10 and 11 are the two terminals, each stirrup shaped and formed out of a piece of sheet metal bent back on itself to leave two cylindrical ends 12 and 13.

Into these is fitted and brazed for electric bonding, a socket member 14 having a flange 15 which abuts against the outside of end 13 of the terminal and a wall 16 at the other end of the socket. The socket is internally threaded as shown at 17.

The braided lead 18 has fitted over it a sleeve 19 of p.t.f.e. and this is inserted into the socket member 14. The end of the sleeve 19 abuts internally against wall 16 leaving a projecting end 20 of the braided lead which passes through a central hole in wall 16 and projects a small distance therefrom as shown at 21. Intermediate of the two ends 12 and 13 of the terminal, the socket member 14 is crimped hexagonally to grip the sleeve and compress it onto the braided lead, the parts assuming the shape shown in Figure 3.

Finally the projecting end 21 of the braided lead is high temperature soldered to the outside of wall 16, the deposit of solder being shown at 22.

In this way any mechanical loading between the terminals is taken by the sleeve 19, the lead 18 being called on to provide only the electrical connnection therebetween.

We claim:

1. The method of connecting an electric lead consisting of a flexible metal conductor to a metal electric terminal which method comprises the steps in the order named of fitting over the lead a sleeve of rubber-like material beyond which the end of the lead projects, providing a terminal with two axially aligned sleeves with a gap between them, passing a metal socket member having a wall at one end with a hole therethrough into the sleeves of the terminal, then brazing the socket member to the sleeves, then passing the sleeved lead into the socket member so that the said end of the lead projects through the hole in said end wall and the end of the sleeve abuts the end wall, then deforming the socket between the two sleeves of the terminal to grip said rubber-like sleeve and compress it about the lead, and then soldering said lead end to said end wall.

2. The method claimed in claim 1 in which the socket is deformed from an initial cylindrical shape into which the sleeve is inserted to a hexagonal shape in which the socket grips the sleeve.

3. The method of claim 1 including the steps of boring and counterboring the socket member and forming in the counterbore a helical groove with intermediate flat ridges.

4. An electric lead and connector terminal assembly including in combination, an elongated electric conductor, a sleeve of rubber-like material covering said conductor except for a short end section, a terminal plate having two integral, axially aligned, longitudinally spaced sleeves extending along one edge thereof, a tubular socket member closely fitting in and bonded to said sleeves and having a through axial bore closely receiving said conductor and a counterbore loosely receiving said covering, said socket member between said spaced sleeves being deformed to grip the rubber-like sleeve, and the exposed end of said conductor being soldered to the outside of the end wall of said socket member.

5. The electric lead and connector terminal assembly as defined in claim 4 in which the wall of the counterbore in said socket member is threaded immediately adjacent the bore and substantially only in the deformed area to better grip the conductor covering sleeve when the socket is deformed.

References Cited in the file of this patent

UNITED STATES PATENTS

| | | |
|---|---|---|
| 284,216 | Lytle | Sept. 4, 1883 |
| 480,152 | Tobey | Aug. 2, 1892 |
| 878,740 | Newman | Feb. 11, 1908 |

(Other references on following page)

UNITED STATES PATENTS

| | | | |
|---|---|---|---|
| 1,318,503 | Meyer | Oct. 14, | 1919 |
| 1,946,713 | Rowley | Feb. 13, | 1934 |
| 2,165,323 | White | July 11, | 1939 |
| 2,255,553 | Funk | Sept. 5, | 1941 |
| 2,288,918 | Parker | July 7, | 1942 |
| 2,346,831 | Drury | Apr. 18, | 1944 |
| 2,392,388 | Joyce | Jan. 8, | 1946 |
| 2,397,568 | Seaman | Apr. 2, | 1946 |
| 2,757,352 | Turley | July 31, | 1956 |

FOREIGN PATENTS

| | | | |
|---|---|---|---|
| 531,947 | Great Britain | Jan. 14, | 1941 |
| 552,503 | Great Britain | Apr. 12, | 1943 |
| 568,632 | Great Britain | Apr. 13, | 1945 |